UNITED STATES PATENT OFFICE.

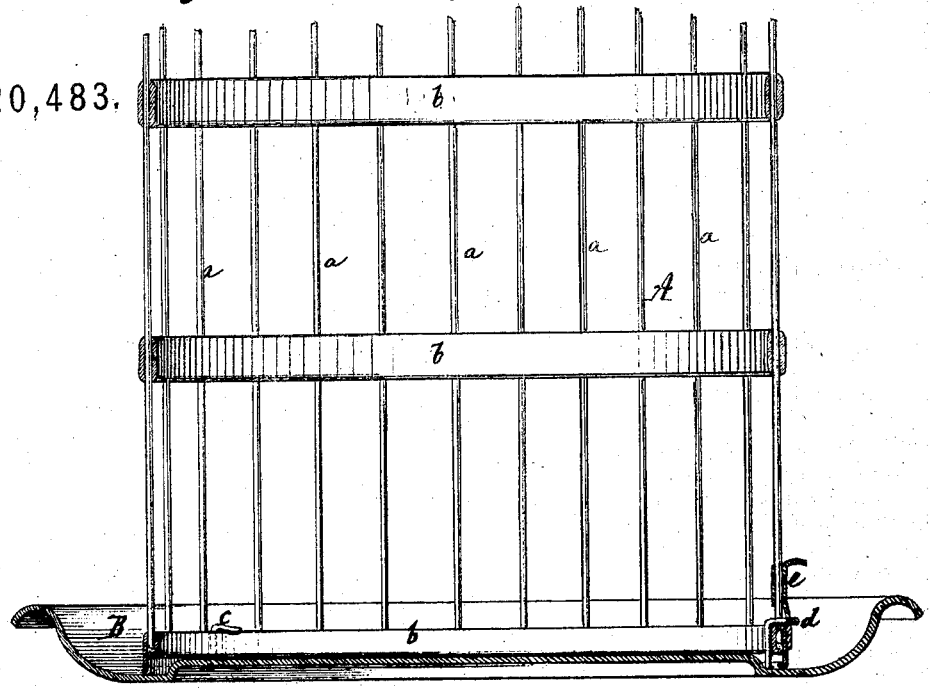
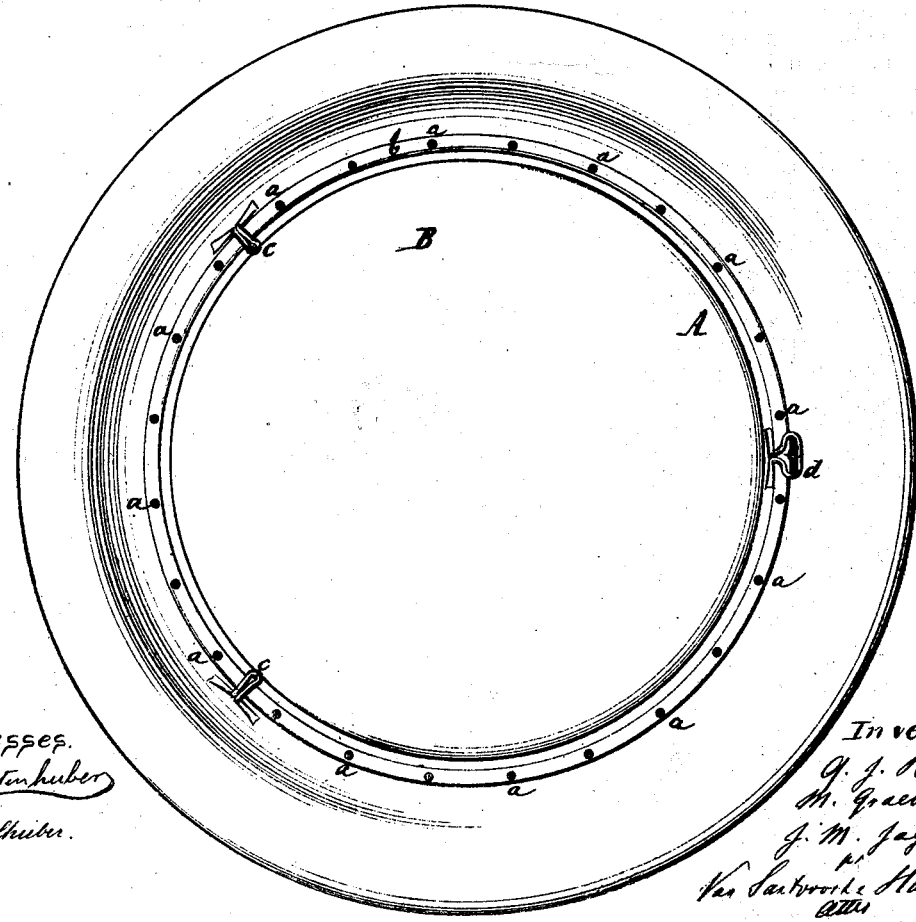

GEORGE J. BOLZ, MICHAEL GREBNER, AND JULIUS M. JAGEL, OF NEW YORK, N. Y.

IMPROVEMENT IN BIRD-CAGES.

Specification forming part of Letters Patent No. 120,483, dated October 31, 1871; antedated October 27, 1871.

*To all whom it may concern:*

Be it known that we, GEORGE J. BOLZ, MICHAEL GREBNER, and JULIUS M. JAGEL, all of the city, county, and State of New York, have invented a new and useful Improvement in Bird-Cages; and we do hereby declare the following to be a full, clear, and exact description thereof, which will enable those skilled in the art to make and use the same, reference being had to the accompanying drawing forming a part of this specification, in which drawing—

Figure 1 represents a vertical central section of this invention. Fig. 2 is a horizontal section of the same.

Similar letters indicate corresponding parts.

This invention consists in the arrangement of a drop-bolt which slides on two of the wires of the cage, in combination with a loop formed at the top of a fixed standard secured in the detachable bottom-edge of the cage, and with fixed hooks which are secured in the detachable bottom and extend over the bottom cross-band in such a manner that when the drop-bolt is raised the bottom can be readily detached from the cage, and when the bottom is returned to its position and the bolt is allowed to drop the cage is securely fastened to its bottom.

In the drawing, A designates the body of my cage, which is constructed of wires $a$, and cross-bands $b$. These cross-bands are made in the form of oblong tubes with holes in the top and bottom for the wires to pass through, and by passing each wire through two holes in each cross-band a firm hold is given to said wires and they are not liable to be displaced or bent out of position by a lateral pressure brought to bear upon them by accident or carelessness. The bottom B is connected to the cage A by means of hooks $c$, a loop, $d$, and a drop-bolt, $e$. The hooks $c$ are firmly secured in the bottom, and they catch from the outside over the bottom cross-band of the cage, while the loop $d$ is also made in the form of a hook secured to the bottom B and catching over the bottom cross-band of the cage from the inside. The drop-bolt slides up and down on two of the wires of the cage, and if the bottom is adjusted in its position and the drop-bolt is allowed to fall down it will catch in the loop $d$ and a firm connection between the cage and the bottom is effected. By raising the drop-bolt up and moving the cage out so that its bottom cross-band will clear the hooks $c$ and the loop $d$ the bottom B becomes disconnected, and it can be readily taken away for the purpose of being cleaned, or for the purpose of nesting the cages for transportation. This fastening for the bottom of a cage is exceedingly simple. The drop-bolt can be made of a plain piece of sheet metal, and all the parts are so arranged that they are not liable to get disengaged or lost.

What we claim as new, and desire to secure by Letters Patent, is—

The drop-bolt $e$, having a projecting point sliding up and down on the wires of the cage, in combination with the single fixed loop $d$ inside the body of the cage, and the fixed hooks $c$, which are secured to the bottom B, outside the body of the cage, all arranged as herein shown and described.

This specification signed by us this 5th day of April, 1871.

GEO. J. BOLZ.
M. GREBNER.
JULIUS M. JAGEL.

Witnesses:
WM. KROLTER,
W. HAUFF.